United States Patent [19]
Sinclair et al.

[11] Patent Number: 5,968,636
[45] Date of Patent: Oct. 19, 1999

[54] LAMINATE FOR FORMING CARTON BLANKS

[75] Inventors: Mark Sinclair, Arvada; John H. Tokarski, Longmont, both of Colo.

[73] Assignee: Graphic Packaging Corporation, Paoli, Pa.

[21] Appl. No.: 08/853,117

[22] Filed: May 8, 1997

Related U.S. Application Data

[63] Continuation-in-part of application No. 08/712,861, Sep. 12, 1996, abandoned.

[51] Int. Cl.$^6$ ........................................ B32B 3/00
[52] U.S. Cl. ........................ 428/201; 428/207; 428/913.3
[58] Field of Search ..................................... 428/195, 201, 428/207, 913.3

[56] References Cited

U.S. PATENT DOCUMENTS

| | | | |
|---|---|---|---|
| 4,254,173 | 3/1981 | Peer, Jr. | 428/204 |
| 4,629,647 | 12/1986 | Sander | 428/172 |
| 5,003,915 | 4/1991 | D'Amato et al. | 118/46 |
| 5,155,604 | 10/1992 | Miekka et al. | 359/2 |
| 5,164,227 | 11/1992 | Miekka et al. | 427/162 |
| 5,200,253 | 4/1993 | Yamaguchi et al. | 428/195 |
| 5,318,807 | 6/1994 | Picoy | 427/510 |

*Primary Examiner*—Deborah Jones
*Assistant Examiner*—Cathy F. Lam
*Attorney, Agent, or Firm*—Klaas, Law, O'Meara & Malkin, P.C.; Joseph J. Kelly, Esq.; William P. O'Meara, Esq.

[57] ABSTRACT

A laminate for forming carton blanks wherein a desired aesthetic holographic appearance is sandwiched between a reversed printed transparent plastic film and a relatively rigid paperboard material. In another embodiment, printed matter and a clear lacquer are imposed on spaced portions of holographic etchings on a transparent film to eliminate the holographic etchings in those areas leaving a remaining portion of the holographic etchings. A metallized substrate covers the printed matter, the clear lacquer and the remaining holographic etchings which can then be laminated to a relatively rigid paperboard.

14 Claims, 2 Drawing Sheets

LAMINATE FOR FORMING CARTON BLANKS

This application is a continuation-in-part application of U.S. patent application Ser. No. 08/712,861 filed Sep. 12, 1996, now abandoned, by Mark Sinclair for Laminate For Forming Carton Blanks.

FIELD OF THE INVENTION

This invention relates generally to laminates for forming carton blanks and more particularly to laminate for forming carton blanks having hologram etchings.

BACKGROUND OF THE INVENTION

In the marketing of products a considerable effort is made in providing a carton that is aesthetically attractive to the consumer. One type of carton utilizes holographic etchings or micro embossing with metallizing highlights to provide an attractive carton. In making such a carton a transparent plastic film is coated with a lacquer and then etched. A metallized coating is then provided on the etchings. The plastic film is then secured to a conventional paperboard so that the outer surface of the plastic film forms the outer surface of the carton so that the metallized holographic etching may be seen through the transparent plastic film. Portions of the outer surface of the transparent plastic film are then inked to provide a laminate having a board printed outer surface with the metallized holographic etchings visible through portions thereof. One problem that exists relative to such a product is that the ink on the outer surface of the transparent plastic film is exposed and can be contacted by deleterious forces to mar the aesthetic quality of the carton.

BRIEF DESCRIPTION OF THE INVENTION

This invention provides a laminate for forming carton blanks from which aesthetically pleasing cartons can be formed wherein the resulting carton has metallized holograph etchings or micro embossings hereinafter referred to only as etchings showing through portions thereof in desired designs and wherein the etchings, the printing associated with such metallized holographic and background lacquer etchings are not exposed to deleterious forces.

In a preferred embodiment of the invention, the desired carton blank is used using a laminate that is somewhat similar to the laminate for forming carton blank disclosed in U.S. Pat. No. 4,254,173 issued Mar. 3, 1981 to A. Dean Peer, Jr., which patent is incorporated herein by reference thereto. In the carton blank of this invention, the transparent plastic film is reverse printed with the desired colors and graphics. A lacquer coating is then applied over the reverse printing and the lacquer coating is then provided with holographic etchings and a metallized coating. The foregoing laminate is then secured to a conventional paperboard with the metallized coating facing the paperboard to form a laminate wherein the reverse printing, the holographic etchings and metallized coating are protected from deleterious forces.

In another preferred embodiment of the invention, a transparent film is etched on one side in a conventional operation. The etched side of the transparent film is then passed under a printing roll that imprints a lacquer over portions of the etchings and inked printed matter over other portions of the etchings and leaves a remaining portion of the etchings. The lacquer and the ink printed matter eliminates the etchings in those portions. A metallized coating is then placed on the lacquer, the printed matter and the remaining portion. This printed, and or metallized substrate is then laminated to a conventional paperboard and then formed into carton blanks.

BRIEF DESCRIPTION OF THE DRAWINGS

Preferred embodiments of the invention are illustrated in the drawings in which.

DETAILED DESCRIPTION OF THE INVENTION

Figure 1:
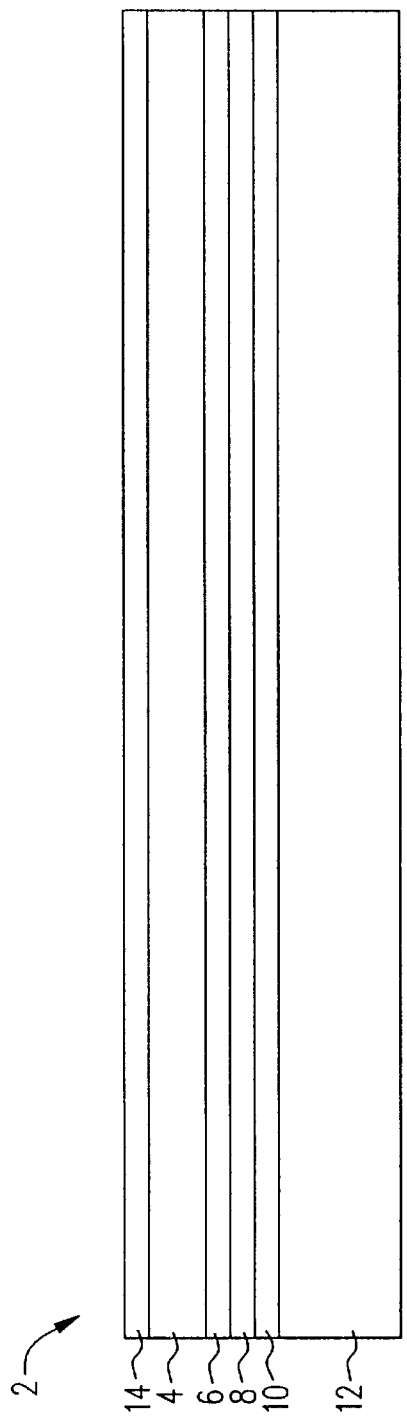
FIG. 1 is a side elevational view of a composite material of the prior art.

In FIG. 1, there is illustrated a composite material 2 of the prior art used to make carton blanks from which cartons may be formed. The composite material 2 has a continuous sheet 4 of a transparent plastic film, formed from a suitable material such as polyethylene terephthalate or other material having similar characteristics. One side of the continuous sheet 4 is coated with a lacquer coating 6 and holographic etchings 8 are formed in the lacquer coating 6 in a conventional process. If desired, a metallized coating 10 is then applied to all or portions of the holographic etchings 8. The treated continuous sheet 4 is then laminated to the continuous sheet 12 of a conventional paperboard material with the metallized coating 10 facing the continuous sheet 12. The laminated material is then passed through suitable conventional apparatus which applies ink characters 14 to the portion of the exposed surface of the continuous sheet 4. The ink characters 14 are chosen to display the desired aesthetic appearance for the carton to be formed from the composite material 2. Instead of applying the ink characters 14 to the continuous sheet 4, the ink characters 14 could be applied to a separate continuous sheet and then laminated to the continuous sheet 4.

Figure 2:
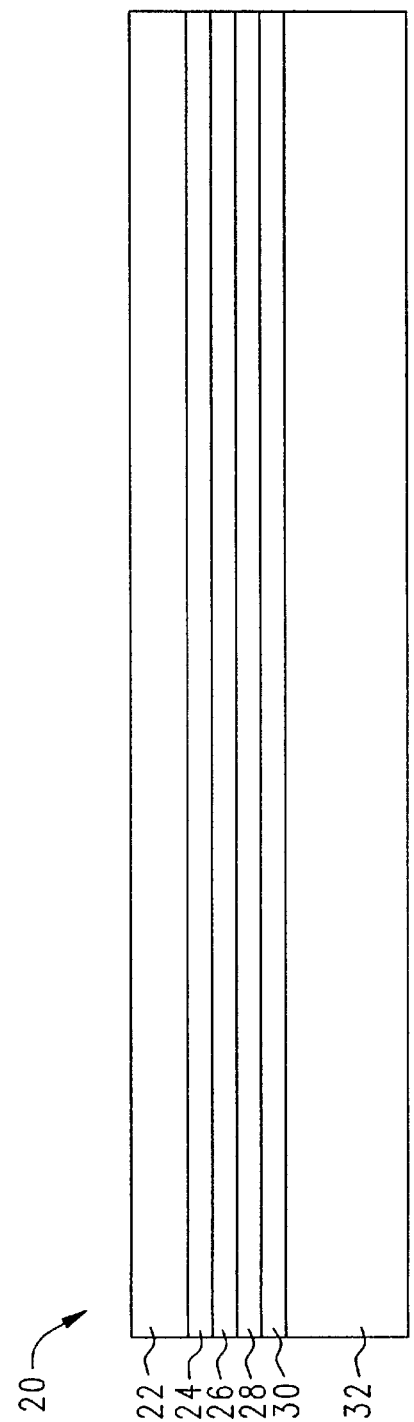
FIG. 2 is a side elevational view of a preferred composite material of this invention.

In FIG. 2, there is illustrated a composite material 20 of this invention to be used in making carton blanks from which cartons may be formed. In making the composite material 20, a continuous sheet 22 of a transparent plastic film, formed from a suitable material such as those described in the Peer, Jr. patent, is passed through suitable conventional apparatus and has reverse printed ink characters 24 applied to portions of one side of the continuous sheet 20. A lacquer coating 26 is then formed over the reverse printed ink characters 24 and all other portions of the continuous sheet 20. Holographic etchings 28 are then formed in the lacquer coating 26 in a conventional manner. If desired, a metallized coating 30 is formed over all of the laquer coating 26 or at least the part having the holographic etchings. The treated continuous sheet 20 is then laminated to a continuous sheet 32 of a conventional paperboard material with the metallized coating 30 facing the continuous sheet 32. The reverse printed ink characters 24 are chosen to display the desired aesthetic appearance to the carton formed from the composite material 20.

In forming the composite material 20, the composite sheet 22 with the reversed printed ink characters 24, the lacquer coating 26, the holographic etchings 26 and the metallized coating 28 may be formed in a separate operation or the lacquer coating 26 the holographic etchings 28 can be made in the in-line process of the Peer, Jr. patent between the printing and metallizer in FIG. 1.

Figure 3:
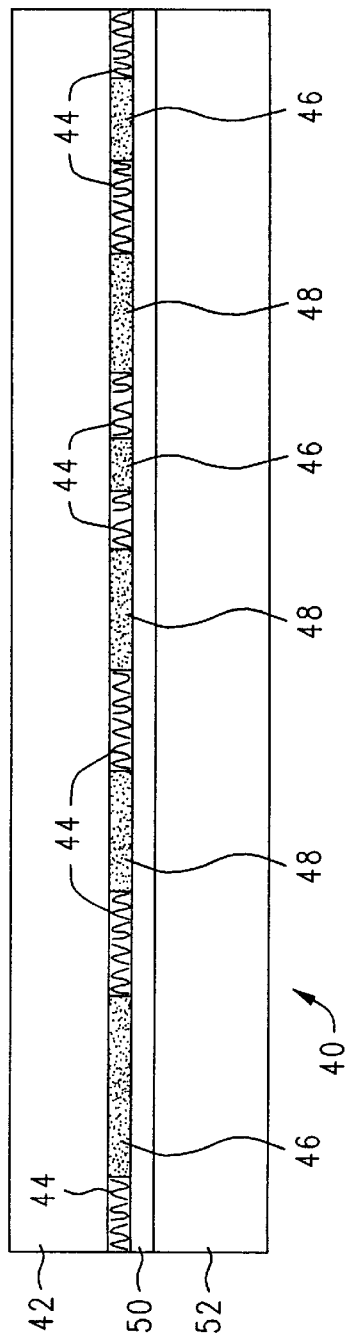
FIG. 3 is a side elevational view of another preferred composite material of this invention.
Figure 5:
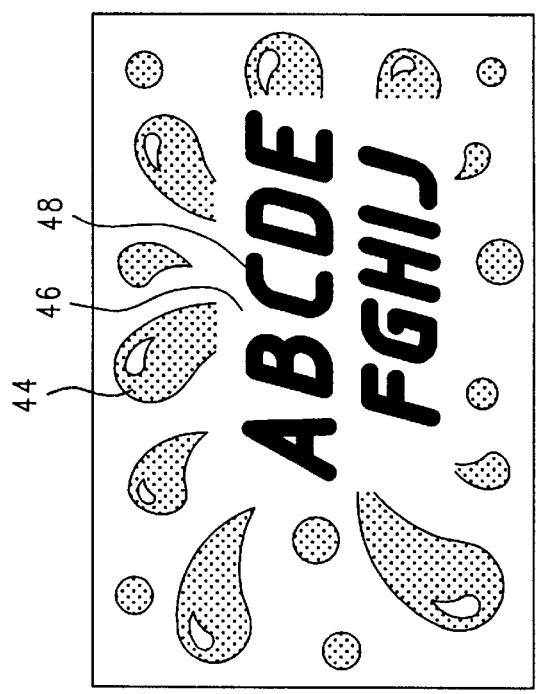
FIG. 5 is a top plan view of the transparent film of FIG. 4 having lacquer and printed matter over a portion of the etchings.
Figure 4:
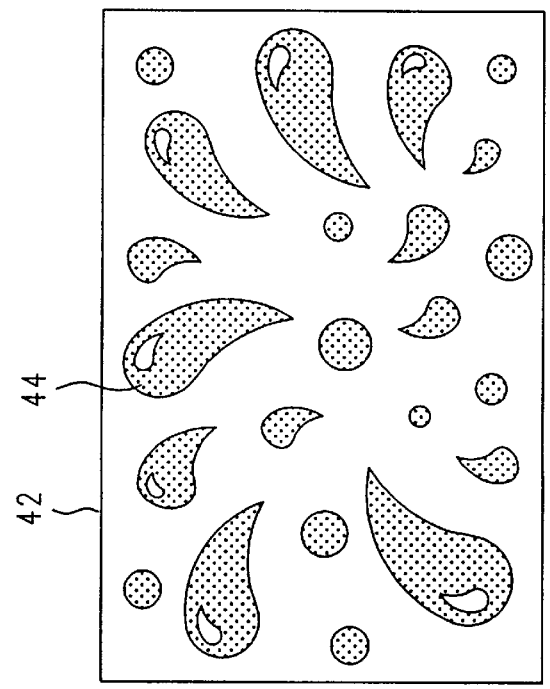
FIG. 4 is a top plan view of a transparent film having holographic etching thereon.

Another preferred embodiment of the inventions illustrated FIGS. 3–5. In a continuous process, such as that described in the Peer, Jr. patent, a composite material is formed. As illustrated in FIG. 3 the composite material 40 comprise a first layer comprising a transparent film 42 having a plurality of spaced apart etchings 44 formed in one surface thereof such as the holographic films marketed by CFC International, Inc. The transparent film 42 with the etchings 44 formed thereon is passed under a printing roll wherein a conventional lacquer 46, preferably clear, and inked printed matter 48, preferably in various colors, is placed on portions of the etchings 44. This fills in the etchings 44 so as to eliminate the effect of the etchings 44 in those areas. The remaining portions of the etchings 44 are not covered and are not effected. A metallized coating 50 is then placed over the lacquer 46, the printed matter 48 and the remaining etchings 44. When the composite material thus formed is to used to form carton blanks, it is laminated to a conventional paperboard 52.

A portion of the carton blank formed from the composite material 40 is illustrated in FIG. 5. The letters A–J comprise the printed matter 48, the white area surrounding the letters comprises the lacquer 46 and the remaining area comprises the remaining portions of etchings 44. The etchings 44 provide the attractive appearance, the letters or other identifying matter, such as figures, provide the identification and the lacquer provides the background. It is understood that the holographic etchings illustrated in FIGS. 4 and 5 can be of an infinite number of designs. Also, the pattern applied by the lacquer can be in an infinite number of patterns to form any desired design in the remaining holographic etchings.

It is contemplated that the inventive concepts herein described may be variously otherwise embodied and it is intended that the appended claims be construed to include alternative embodiments of the invention except insofar as limited by the prior art.

What is claimed is:

1. A composite material comprising:
    a transparent plastic film having an outer surface and an inner surface;
    reverse decorative printing on portions of said inner surface;
    a lacquer coating over said inner surface including said reverse decorative printing;
    said laquer coating having an inner surface and an outer surface with said outer surface facing said reverse decorative printing;
    holographic etchings formed in said inner surface of said lacquer coating; and
    a substrate coating over said holographic etchings and said lacquer coating.
2. A composite material as in claim 1 wherein:
    said substrate coating is a metallized coating.
3. A composite material as in claim 1 and further comprising:
    a layer of relatively rigid material secured to said substrate coating.
4. A composite material comprising:
    a transparent plastic film having an outer surface and an inner surface;
    a first lacquer coating on said inner surface;
    said first lacquer coating having an inner surface and an outer surface with said outer surface facing said inner surface of said transparent plastic film;
    exposed holographic etchings formed in portions of said inner surface of said first lacquer coating;
    reverse decorative printing ink placed on portions of said inner surface of said first lacquer coating to eliminate at least portions of said exposed holographic etchings;
    a second lacquer coating placed in areas of said inner surface of said first lacquer coating in and around said reverse decorative printing ink and areas of said inner surface between said reverse decorative printing ink and said exposed holographic etchings to remove at least other portions of said exposed holographic etchings; and
    a substrate coating over said inner surface.
5. A composite material as in claim 4 and further comprising:
    a layer of relatively rigid material secured to said substrate coating.
6. A composite material as in claim 5 wherein:
    said substrate material is a metallized coating.
7. A composite material as in claim 4 wherein:
    said substrate material is a metallized coating.
8. A method for forming a composite material from a roll of material comprising a continuous sheet of a transparent plastic film having spaced apart exposed holographic etchings formed in one surface thereof comprising:
    passing successive portions of said continuous sheet through at least one apparatus for applying at least one material on at least portions of said one surface; and
    applying portions of said at least one material on portions of said exposed holographic etchings to eliminate the effect of said exposed holographic etchings at said portions of said exposed holographic etchings.
9. A method as in claim 8 wherein said applying step comprises:
    applying on spaced apart portions of said exposed holographic etchings a desired pattern of ink printed matter to eliminate the effect of said exposed holographic etchings at said spaced apart locations and leaving visible said desired pattern of ink printed matter; and
    applying on other spaced apart portions of said exposed holographic etchings and areas surrounding and between said desired pattern of ink printed matter a lacquer coating to eliminate the effect of said exposed holographic etchings at said other spaced apart locations and said areas surrounding and between said desired pattern of ink printed matter.
10. A method as in claim 9 and further comprising:
    applying a substrate material to said one surface.
11. A method as in claim 9 and further comprising:
    laminating a layer of a relatively rigid material to said substrate material.
12. A method as in claim 11 and further comprising:
    using a metallized material as said substrate material.
13. A method as in claim 10 and further comprising:
    using a metallized material as said substrate material.
14. A method for forming a composite material comprising a continuous sheet of a transparent plastic film comprising:
    passing successive portions of said continuous sheet through at least one apparatus and imprinting on one surface thereof reverse printed matter;
    applying a lacquer coating on said one surface;
    forming holographic etchings in portions of said lacquer coating;
    applying a substrate coating over said holographic etchings and said lacquer coating; and
    laminating a layer of a relatively rigid material to said substrate coating.

* * * * *